June 18, 1968 R. HARDING 3,388,861
THERMALLY CONTROLLED MIXING VALVES
Filed Aug. 22, 1966 3 Sheets-Sheet 3
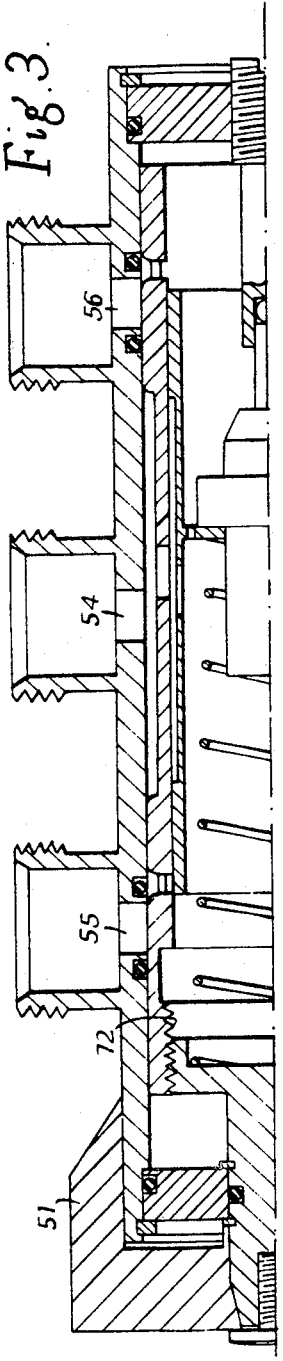
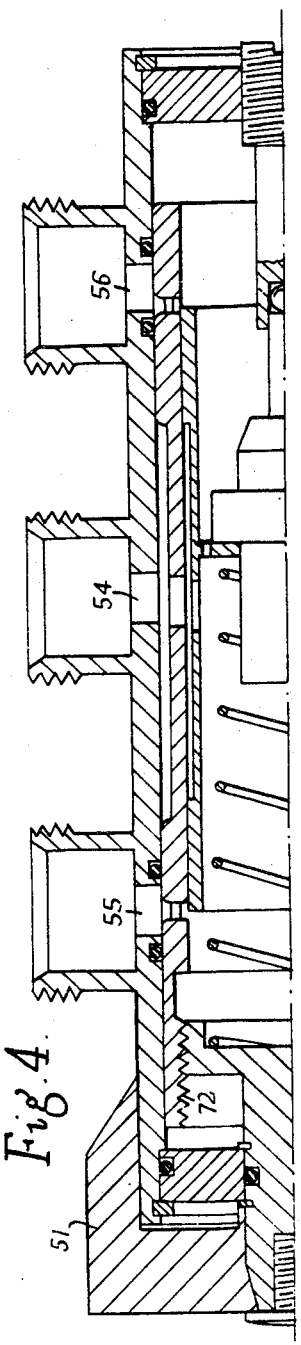
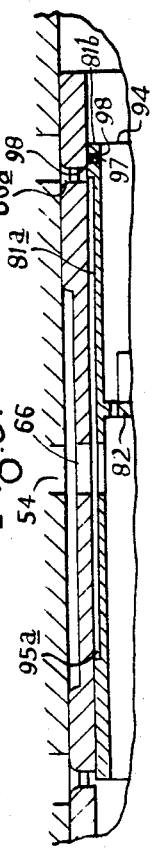

United States Patent Office
3,388,861
Patented June 18, 1968

3,388,861
THERMALLY CONTROLLED MIXING VALVES
Richard Harding, 17 Lowlands, Eton Ave.,
London NW. 3, England
Filed Aug. 22, 1966, Ser. No. 574,031
Claims priority, application Great Britain, Aug. 24, 1965,
36,390/65
10 Claims. (Cl. 236—12)

ABSTRACT OF THE DISCLOSURE

Thermostatically controlled mixing valves and particularly such valves for use with showers. The mixing valve of the invention comprises a valve body with hot and cold water inlet ports and an outlet port, an inner member sliding in the valve body and having hot and cold water inlet port means and outlet port means and an adjustment member slidable within the control valve under the actuation of a thermostat element to control the amount of water passing respectively through the hot and cold water inlet port means.

---

Figure 1:
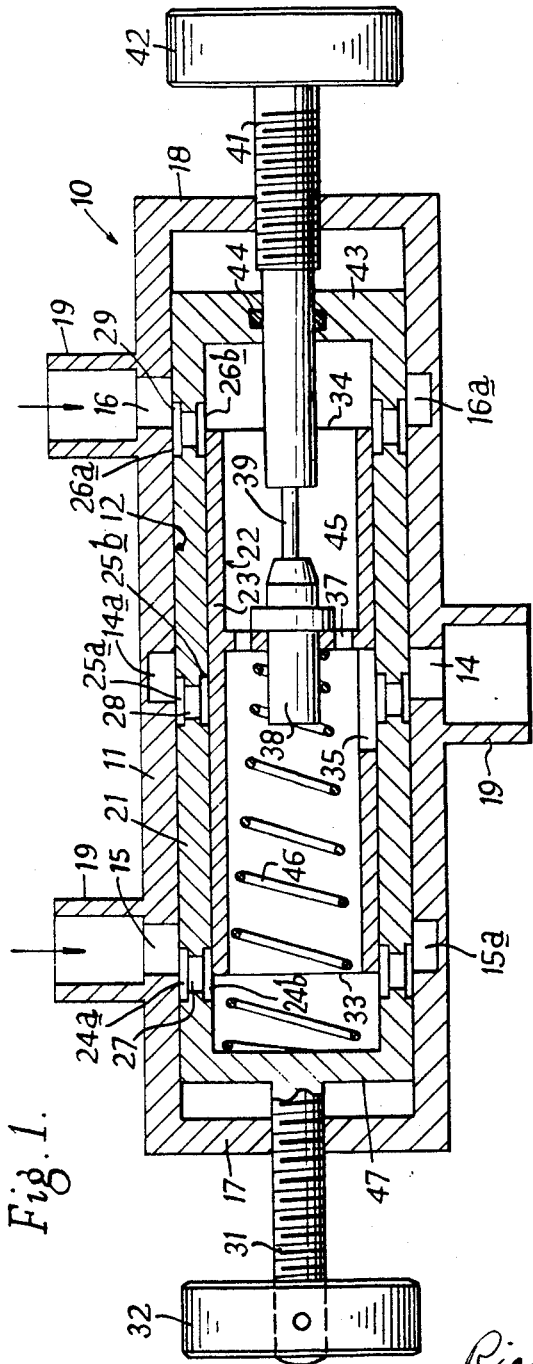

This invention relates to thermostatically controlled mixing valves and in particular such valves for producing a stream of water of a substantially constant controlled temperature from separate hot and cold water streams. Such valves find particular application with showers where the temperature of the emitted stream, after it has been set, may vary to an uncomfortable extent because of demands made upon the water system elsewhere.

This invention provides a mixing valve comprising a body having an elongated valve passage into which open at spaced locations two inlet ports and an outlet port, a temperature control valve having two inlets and an outlet and being movable axially of the valve passage by a thermostat element in dependence upon the temperature of fluid flowing from the inlets to the outlets, and a hollow adjustment member longitudinally slidable within the valve passage and within which the temperature control valve is slidable, the adjustment member having two inlet port means and an outlet port means which co-operate with the inlet and outlet ports to allow the passage of fluid therefrom or thereto to and from the said inlets and outlet respectively, the said inlet port means being controlled by the control valve to vary the proportion of the flow areas of the two inlet port means.

Preferably there is further provided manually adjustable means located exteriorly of the body for varying the location of the adjustment member in the valve passage.

Conveniently the relative spacing between the inlet ports and the inlet port means is such that as the adjustment member moves longitudinally of the valve passage, the combined flow areas through the inlet port means increases. Thus in this arrangement the adjustment member controls the amount of flow through the mixing valve.

Alternatively the relative spacing between the inlet ports and the inlet port means may be such that as the adjustment member moves longitudinally of the valve passage the relative flow areas of co-operating pairs of inlet ports and inlet port means varies. Thus in this arrangement the adjustment member controls the proportions of hot and cold water flowing through the mixing valve.

Conveniently the control valve has a waisted portion which defines an annular space with which the outlet and outlet port means communicate and preferably the length of the waisted portion is such that when one of the inlet ports is isolated from its associated inlet, the said inlet port communicates directly with the said annular space.

This gives protection against scalding in the arrangement wherein otherwise the cold water inlet of the control valve would be isolated from its supply and the hot water inlet is subject to full hot water supply as may occur for example when the mixing unit is being initially used and the thermostat element has not yet had an opportunity to react to the water temperature.

Embodiments of the invention will now be described by way of example with reference to the accompanying drawings.

Figure 2:
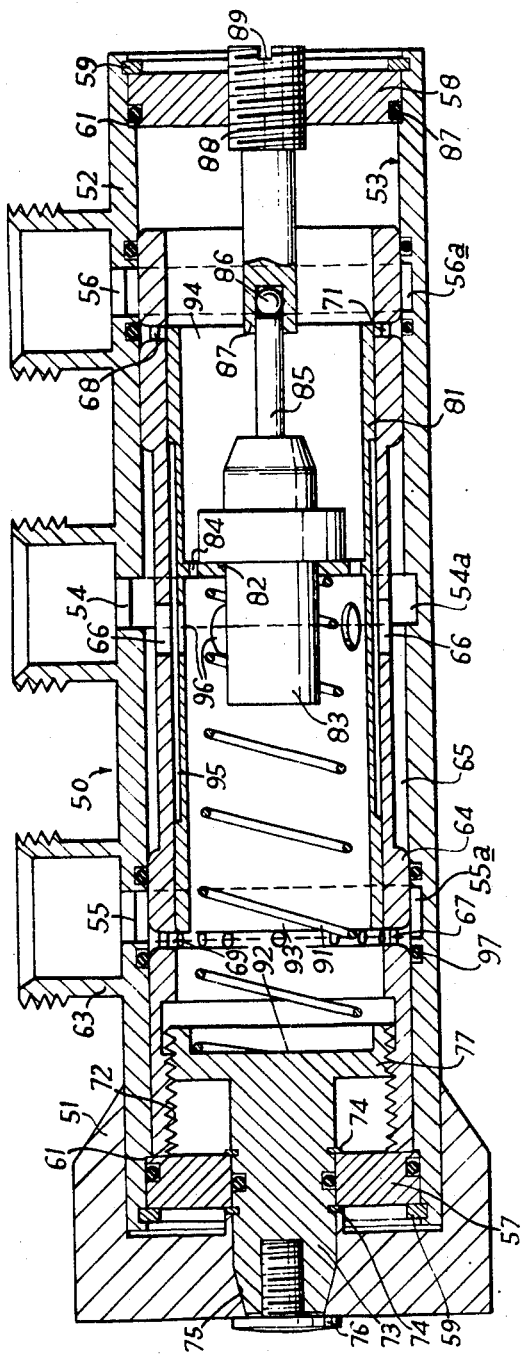

In the drawings:

FIGURE 1 is a diagrammatic longitudinal section through a mixing valve of the invention, FIGURE 2 is a similar section through another mixing valve of the invention, FIGURES 3 and 4 are half sections of the mixing valve of FIGURE 2 with the parts in different positions, and FIGURE 5 is a detail section of a mixing valve of FIGURE 2 using a modified temperature control valve.

Referring now to FIGURE 1, the mixing valve 10 comprises a body 11 having a tubular bore or valve passage 12. An outlet port 14 opens into the bore 12 at about its mid-point and two inlet ports 15 and 16 open into the bore 12 about midway between the outlet port 14 and the closed off ends 17 and 18 of the body. These inlet ports 15 and 16 are located at diametrically opposed positions relative to the outlet port 14. Tubular projections 19 extend radially from the body 11 and surrounding the ports 14, 15 and 16 so that these may be connected to an outlet such as a shower head and to sources of hot and cold water respectively.

A tubular adjustment member 21 is axially slidable within the valve passage 12 and within the bore 22 of the adjustment member 21 a tubular temperature control valve 23 is slidably received. The adjustment member 21 has three pairs of registering annular grooves 24a, 24b, 25a, 25b and 26a and 26b on its inner and outer peripheries, the grooves 24a and 24b; 25a and 25b and 26a and 26b being joined respectively by sets of passages 27, 28 and 29 passing through the material of the member. The fluid flow passages 24a, 27 and 24b; 25a, 28 and 25b; and 26a, 29 and 26b are hereinafter referred to as the hot water inlet port means 24; the outlet port means 25 and the cold water inlet port means 26, respectively. The port means 24, 25 and 26 cooperate with the ports 15, 14 and 16 respectively. To improve such co-operation the valve passage 12 has internal annular grooves 14a, 15a and 16a communicating with ports 14, 15 and 16 and having the same axial length as the grooves 25a, 24a and 26a respectively. The location of the grooves 14a, 15a and 16a and 25a, 24a and 26a is such that in one position of the adjustment member 21 (hereinafter called the "full on position"), these grooves respectively register.

One end of the adjustment member 21 has a threaded rod 31 which projects in threaded relation through the closed off end 17 of the body 11. A hand wheel 32 of appropriate size is attached to the free end of the rod 31. By rotating the hand wheel 32 and hence the rod 31, the adjustment member can be moved axially within the valve passage 12.

The tubular control valve 23 has open ends 33 and 34 which constitute respectively hot and cold inlets to the control valve respectively. An enlarged port opening 35 is provided in the control valve 23 to constitute an outlet therefrom. Internally the control valve 23 is divided by an apertured partition 36 having an enlarged central aperture surrounded by a number of flow passages 37. The "top hat" like chamber of a conventional longitudinally expanding wax filled thermostat element 38 is received in the central aperture so that the plunger 39 of the thermostat 38 projects away from the closed end 17 of the body 11. A temperature adjusting rod 41 is screw-threaded through the closed end 18 of the body 11. At its outer end this rod 41 has a hand wheel 42 of suitable dimensions. The rod 41 passes through one end 43 of the adjustment member 21 and is sealed thereagainst by an O ring 44. The inner end 45 of the rod 41 bears against the piston 39 to act as an adjustable abutment therefor. A coil spring 46 has one end acting against the partition 36 and the other acting against the other wall 47 of the adjustment member 21.

The length of the control valve 23 is the same as the distance between the centres of the grooves 24b and 26b. Thus if the control valve 23 moves relative to the adjustment member 21 the proportions of the flow areas of the inlet port means 24 and 26 varies.

The mixing valve 10 is used as follows. The ports 15 and 16 are connected to sources of hot and cold water respectively and port 14 is connected to the head of a shower. Initially, the adjustment member 21 will be moved to its position closest to the end closure 17 of the body 11 (i.e. the "full off" position) in which the inlet port means 24 and 26 are off-set from the inlet ports 15 and 16 respectively. On movement of the adjustment member 21 towards the "full on" position, greater amounts of the inlet port means 24 and 26 are exposed to the inlet ports 15 and 16 respectively so that greater amounts of the water will flow through these ports. The water will pass through the inlet port means 24 and 26 into the inlets 33 and 34 respectively of the control valve 23 and thence through the outlet 35, the outlet port means 25 and the outlet port 14 towards the shower head. The position of the control valve 23 within the adjustment member 21 is set by the rod 41. By adjusting the location of this rod 41 within the body 11, the position of the thermostat 38 is set and thus the position of the control valve 23 is pre-set so that the flow area through the inlet port means 24 and 26 and hence the amount of water flowing therethrough will vary in dependence upon the setting of the control valve 23 within the adjustment member 21. After the control valve 23 has been set within the adjustment valve 21 so that water of the correct temperature is flowing through the outlet port 14. If now the demand on, say, the cold water supply at another place in the water system should increase so that there is less cold water being supplied to the mxing valve 10, the temperature of the water within the control valve 23 will rise because of the increased content of hot water. This will cause the thermostat 38 to expand, moving the control valve 23 to the left in FIGURE 1. This will result in a greater amount of the hot water inlet means 24 being closed and a larger amount of the cold water inlet port means 26 being opened until the portions of hot and cold water flowing into the interior of the control valve 23 balance so that the correct temperature of water passes out of the outlet port 14.

In the mixing valve 10 above described, the various end parts 17, 18 of the body and the end portions of the adjustment member 21 may be formed by collars which are screwed into the body section.

If desired the rod 41 can be slidable in the end 18 of the body 11 and threaded into the end of the adjustment valve 21 so that the temperature setting will not vary with the setting of the adjustment member 21.

Referring now to FIGURE 2, the mixing valve 50 herein shown is operated by a single hand wheel 51 which controls both switching on and off the water flow as well as controlling the desired temperature. The mixing valve 50 has a body 52 within which is a valve passage 53. Approximately mid-way along the length of the body 52 there is an outlet port 54. A hot water inlet port 55 and a cold water inlet port 56 are provided on either side of the outlet port 54. The end members 57 and 58 are held in position by circlips 59 and shoulders 61 formed at either end of the valve passage 53. As in mixing valve 10, the ports 54, 55 and 56 merge into internal annular grooves 54a, 55a and 56a formed in the body 52 and tubular outlets 63 are provided surrounding the ports 54, 55 and 56 and having their outer ends screw-threaded for connection to unions or the like. In this particular arrangement the three ports 54, 55 and 56 are aligned so that the tubular projection 63 are all on one side of the valve.

A tubular adjustment member 64 is slidable within the valve passage 53. This member 64 has a waisted central portion that defines an elongated annular space 65 which is in communication with the outlet port 54 in whatever position the adjustment member 64 occupies within the valve passage 53. Outlet port means 66 are provided centrally of the adjustment member 64 communicating with the annular space 65. Adjustment member 64 has internal and external pairs of grooves at spaced locations on either side of the annular space 65 and radial passages 67 and 68 connect the pairs of grooves together. These grooves together with passages 67 and 68 form respectively two inlet port means 69 and 71 (referred to hereinafter as the hot water inlet port means 69 and the cold water inlet port means 71). The adjustment member 64 extends beyond the hot water inlet port means 69 and is internally screw-threaded at 72. The adjustment member 64 has a short axial slot (not shown) in its outer periphery which engages in a pin in the body 52 to prevent the former rotating.

A flanged shaft 73 passes through the end member 57 being held in position by circlips 74. The shaft 73 is secured to the hand wheel 51 so that on rotation of the latter the shaft 73 will rotate. These two parts are secured by having mating tapered portions 75 which are drawn into tight engagement by a screw 76 that engages in the shaft 73. The flange 77 of the shaft 73 is threaded and in threaded engagement with the portion 72 of the adjustment member 64. Thus on rotation of the hand wheel 51 the adjustment member 64 will be moved axially because of the nut and screw engagement between the shaft 73 and the adjustment member 64.

A tubular control valve 81 is slidably mounted within the adjustment valve 64. This control valve 81 is generally similar to the valve 23 described above, having a centrally apertured partition 82 which receives an axially movable wax filled thermostat element 83 and having flow passages 84 spaced around the central aperture. The piston 85 of the thermostat element 83 bears against a movable abutment in the form of a ball bearing 86 carried in the end of a shaft 87, the free end 88 of which is threaded into the closure member 58. The exposed end of this shaft 87 has a slot 89 whereby its position may be adjusted by a screw-driver. An internal compression spring 91 acts between the base of a recess 92 in the flange 77 of the member 73 and the partition 82 so as to urge the control member 81 towards the closure member 58 (which is on the right hand side of FIGURE 2).

The length of the control valve 81 is the same as the distance between the centres of the passages 68 and 69, one end 93 of the control valve 81 forming a hot water inlet and the other end 94 acting as the cold water inlet to the control valve. The control valve 81 is centrally waisted to form an annular space 95 which is in communication with the outlet port means 66 in every position of the control valve relative to the adjustment member. An outlet 96 is provided in the control. Valve opening into this annular space 95.

O rings 97 are provided between the various relatively moving parts of the body 52, adjustment member 64, end closures 58 and 57 and shaft 73 as and where necessary or desirable as shown in FIGURE 2.

The relative location of the hot water and cold water inlet port means 69 and 68 and the hot and cold water ports 55 and 56 is such that on axial movement of the adjustment member 64 the proportions of the flow areas of the hot water inlet port means 69 to the cold water inlet port means 68 is varied.

In FIGURE 2 the mixer valve 50 is shown in the "full hot" condition. In FIGURE 3 the mixer is shown in the "full cold" position whereas in FIGURE 4 the mixer valve 50 is shown in a "half and half position."

In use the projection 63 surrounding the ports 55 and 56 are connected respectively to the hot and cold water supplies and the projection 63 surrounding the port 54 is connected through piping or a flexible member to the shower rose.

When the adjustment member 64 is located further to the right than shown in FIGURE 3 and the lands on the left of the port means 68 and 69 shut off both the inlet ports 55 and 56. Thus the mixing valve 50 is in its fully closed position.

On initial rotational movement of the hand wheel 51 the cold water inlet port means 68 will open to the cold water inlet 56 so that cold water will pass through port 56 and cold water inlet port means 71 and inlet 94 and thence through the control valve 81 so as to surround the thermostat element 83 and finally through the outlet 96, outlet port means 66 and outlet port 54.

On further rotation of the hand wheel 51, a portion of the hot water inlet will be open to the hot water inlet port means 69 so that the two water streams will mix within the control valve means and water of a suitable temperature will eventually be emitted from the outlet port 54. A medium position is shown in FIGURE 4. In this position approximately equal amounts of hot and cold water will enter into the control valve 81. Assuming the mixing valve 50 is operated in this condition and there should be a demand on the water supply from another location, then the temperature of the water coming into the control valve will alter so that the length of the thermostat will alter in response to this temperature alteration. This will move the control valve 81 relative to the adjustment member 64 varying the flow areas of the two inlet port means until the proportions of the two water streams is adjusted until the desired temperature of water at the outlet is substantially maintained.

As only one hand wheel 51 is being used, it is of importance that the axial movement of the control valve should be related to the axial movement of the thermostat element 83 in order that the control valve will be centrally located with respect to the adjustment member in each position thereof. In other words, when the adjustment member 64 is set in position, the temperature of the water passing through the control valve 81 and around the thermostat element 83 should be such as to ensure that the thermostat element 83 will centralise the control member 81 within the adjustment valve 64. For this reason and as the thermostat expands quite considerably, the screw threads 72 will have a rather large pitch which may be as much as one inch. A multi-start thread should be used.

If an initial use of the mixing valve 50, the hand wheel is turned to a hot position, there is the danger that the movement of the adjustment member 64 will be considerably faster than the movement of the control valve 81. This is because the initial response from cold of the thermostat element 83 is not very quick. Thus the position may arise under these circumstances that the control valve 81 will close off the cold water inlet port means 71 while leaving the hot water inlet port means 69 fully open. Scaldingly hot water can now pass to the outlet port 54. To prevent this occuring the control valve may be waisted as shown in FIGURE 5. In this arrangement the axial length of the annular space 95a surrounding the control valve 81a is such that when its inlet 94 is isolated from the cold water inlet port means 68a, the latter communicated with the annular space 95a. Thus some cold water by-passes the thermostat element 83 and passes directly to the outlet port means 66 and outlet port 54. This serves to prevent scalding. This safety feature also operates where there has been a demand on the hot water elsewhere in the system to the extent that the thermostat element moves the control valve so that the hot water inlet port means is fully opened and the cold water inlet port means 68 is isolated from the inlet 94 and subsequently there is suddenly a return of hot water. In order better to support the cold water inlet side of the control valve 81a, this has an extension 81b and the cold water inlet is constituted by a number of radial passages 97 passing between grooves 98 on the inner and outside on the control valve 81. This scaldingly hot water preventing feature may be embodied on the control valve 23 of the mixing valve 10. (See FIGURE 1.)

The mixing valves described above maintain a substantially constant outlet temperature in use. The thermostat elements, once they have warmed up, have a quick response to temperature changes. The mixing valves may be easily serviced. By moving the adjustment members to the "full off" position the control valve may be removed from the mixing valve without isolating the mixing valve from its supply, and the control valve, the return spring and/or the thermostat element may then be cleaned, repaired or replaced.

I claim:
1. A mixing valve comprising:
   (a) a valve body having an elongated valve passage therethrough and two inlet ports and an outlet port opening into the valve passage;
   (b) a hollow adjustment member longitudinally slidable within the valve passage and having two inlet port means and an outlet port means positioned to cooperate respectively with the inlet ports and outlet ports, the adjustment member controlling the size of the said inlet ports in dependence upon the location of the adjustment member in the valve passage;
   (c) a handle located outside the valve body and being connected to the adjustment member to move the latter longitudinally in the valve passage;
   (d) a control valve longitudinally slidable within the adjustment member and having two inlets and an outlet adapted to cooperate respectively wtih the two inlet port means and the outlet port means, the control valve varying the ratio of the flow areas through the two inlet port means depending upon the location of the control valve in the adjustment means; and
   (e) a thermostat element within the valve body and connected to the control valve to move the control valve, the thermostat element lying in the flow path to the outlet port and being arranged to move the control valve relative to the adjustment member in dependence upon the temperature of the fluid passing to the outlet port.

2. A mixing valve as claimed in claim 1 wherein the said thermostat element comprises a wax filled thermostat element.

3. A mixing valve as claimed in claim 1 wherein the outlet port means in said adjustment member is continuously in communication with said outlet port.

4. A mixing valve as claimed in claim 1 wherein an adjustable abutment is provided against which the thermostat element bears.

5. A mixing valve as claimed in claim 4 further comprising manually adjustable means located exteriorly of the body and connected to said abutment for varying the location of the said abutment.

6. A mixing valve as claimed in claim 5 wherein the means for varying the location of the abutment comprises a nut and bolt mechanism in which rotation of one member causes longitudinal movement of the other.

7. A mixing valve as claimed in claim 1 wherein the relative spacing between the inlet ports and the inlet port means is such that as the adjustment member moves longitudinally of the valve passage the combined flow areas through the inlet port means increases.

8. A mixing valve as claimed in claim 1 wherein the relative spacing between the inlet ports and the inlet port means is such that as the adjustment member moves longitudinally of the valve passage the relative flow areas of cooperating pairs of inlet ports and inlet port means varies.

9. A mixing valve as claimed in claim 1 wherein the control valve has a waisted portion that defines an annular space between the control valve and the adjustment member with which the outlet and outlet port means communicate.

10. A mixing valve as claimed in claim 9 wherein the length of the waisted portion is such that when one of the inlet ports is isolated from its associated inlet, the said inlet port communicates directly with the said annular space.

References Cited
UNITED STATES PATENTS

| | | | |
|---|---|---|---|
| 2,609,146 | 9/1952 | Heikes | 236—12 |
| 2,943,792 | 7/1960 | Moen | 236—12 |
| 3,112,879 | 12/1963 | Killias | 236—12 |

ROBERT A. O'LEARY, *Primary Examiner.*

W. E. WAYNER, *Assistant Examiner.*